(12) United States Patent
Miyata et al.

(10) Patent No.: US 7,044,499 B2
(45) Date of Patent: May 16, 2006

(54) AIR BAG APPARATUS FOR MOTORCYCLE, METHOD OF MANUFACTURING AIR BAG APPARATUS FOR MOTORCYCLE, AND MOTORCYCLE WITH AIR BAG APPARATUS

(75) Inventors: Yasuhito Miyata, Shiga (JP); Tadahiro Igawa, Hikone (JP)

(73) Assignee: Takata Corporation, (JP)

( * ) Notice: Subject to any disclaimer, the term of this patent is extended or adjusted under 35 U.S.C. 154(b) by 218 days.

(21) Appl. No.: 10/438,619

(22) Filed: May 15, 2003

(65) Prior Publication Data

US 2003/0214121 A1    Nov. 20, 2003

(30) Foreign Application Priority Data

May 15, 2002    (JP) .............. 2002-140768

(51) Int. Cl.
*B60R 21/22*    (2006.01)
(52) U.S. Cl. .................... 280/730.1; 280/729
(58) Field of Classification Search ............ 280/730.1, 280/729, 728.2, 743.1
See application file for complete search history.

(56) References Cited

U.S. PATENT DOCUMENTS 5,938,231 A * 8/1999 Yamazaki ............... 280/730.1
6,007,090 A * 12/1999 Hosono et al. .......... 280/730.2
6,536,800 B1 * 3/2003 Kumagai et al. ........ 280/743.1
2003/0189323 A1    10/2003 Akiyama et al.

FOREIGN PATENT DOCUMENTS

| DE | 100 04 307 A1 | 8/2001 |
| DE | 103 15 533 A1 | 11/2003 |
| JP | 10006901 A * | 1/1998 |
| JP | 2001219884 | 8/2001 |
| JP | 2001219885 | 8/2001 |
| JP | 2002-137780 | 5/2002 |

* cited by examiner

*Primary Examiner*—David R. Dunn
(74) *Attorney, Agent, or Firm*—Fitch, Even, Tabin & Flannery

(57) ABSTRACT

An air bag apparatus is provided having an air bag that is configured to include portions that correspond to the rider motions generated in motorcycle accidents. The air bag apparatus has an air bag provided on a motorcycle and which includes a first expansion part which is expanded toward a rider protection region which is formed above a body constituent part of the motorcycle and in front of the motorcycle rider in the case of the forward collision of the motorcycle; and a second expansion part which is expanded toward a rider protection region at pitching which is formed in front of the motorcycle rider in the pitching of the motorcycle around a front wheel due to the forward collision of the motorcycle.

14 Claims, 16 Drawing Sheets

AIR BAG APPARATUS FOR MOTORCYCLE, METHOD OF MANUFACTURING AIR BAG APPARATUS FOR MOTORCYCLE, AND MOTORCYCLE WITH AIR BAG APPARATUS

FIELD OF THE INVENTION

The present invention relates to a fabrication technology of an air bag apparatus mounted on a motorcycle.

BACKGROUND OF THE INVENTION

A technology for protecting a rider on a motorcycle by mounting an air bag apparatus on a motorcycle is known. For example, Japanese Unexamined Patent Application Publication No. 2001-219885 discloses a scooter-type motorcycle and a technology for inflating and expanding an air bag located in the space between a body component member such as a head pipe, etc. and a seat on which the rider sits. The technology suggests the possibility of providing with an air bag apparatus in the scooter-type motorcycle, but there also remains the requirement of a technological further study in the design of the air bag apparatus for a motorcycle while regarding the movement of the motorcycle in the case of the motorcycle-involved accident.

SUMMARY OF THE INVENTION

Accordingly, the present invention is made to solve the above problem, and it is directed to provide an usefully available technology in the building of an air bag apparatus capable of operating according to the movement of the motorcycle when an accident happens.

To achieve the above objective, the inventions described hereinafter are provided.

According to one form of the invention, an air bag apparatus having an air bag and provided on a motorcycle is provided. The air bag includes a first expansion part which is expanded toward a rider protection region of the motorcycle which is formed in front of the motorcycle rider and above a body constituent part in the case of the forward collision of the motorcycle.

In addition, the air bag includes a second expansion part which is expanded toward a rider protection region of the motorcycle at pitching which is formed in front of the motorcycle rider in the pitching of the motorcycle around a front wheel of the motorcycle due to the forward collision of the motorcycle. According to the present invention, the first expansion part prevents a rider from being thrown in front of the motorcycle due to the forward collision of the motorcycle, and the second expansion part prevents the rider, who is about to be thrown beyond the rider protection region of the motorcycle in front of the motorcycle when the pitching of the motorcycle due to the forward collision of the motorcycle, thus the restraining and protection of the rider in the case of a forward collision can be further assured.

In the specification, "motorcycle" broadly defined as a mounting vehicle, that is, broadly all types of vehicles on which a rider sits astride a seat, and includes, for example, a two-wheeled vehicle having a fuel tank provided in front of a rider's seat, a scooter-type two-wheeled vehicle having a space between the rider's seat and a head pipe for supporting a handle, or the like. In addition to the two-wheeled vehicle, a broader meaning of "motorcycle" also includes a vehicle having three or more-wheels and which a rider sit astride (for example, a three-wheeled vehicle used to deliver pizzas, etc., a three or four-wheeled buggy-type vehicle for traveling on roads in bad condition), or furthermore, a vehicle which is driven by snowshoe or pedrail and on which a rider sits astride such as a snowmobile, etc. The "body constituent part" includes a fuel tank in front of a rider's seat, a handle, a head pipe for supporting the handle, and indicating instruments such as a speedometer provided in the middle of the handle, or the like.

Further, in the present invention, the "forward collision" broadly includes the collision shape in which a motorcycle collides with a collision object obliquely, or in which just a part of the forward parts of the vehicle collides with a collision object head on as well as in its literal sense, the shape in which a motorcycle collides with a collision object head on. In addition, the "rider protection region of the motorcycle" at the forward collision means a space region for preventing a rider from being thrown in front of a motorcycle while restricting the forward movement of the rider when the rider is about to move toward in front of the motorcycle by the kinetic energy of the driving motorcycle, normally when the motorcycle does not pitch in the forward collision.

Further, "pitching" in the specification means one of the typical moving shapes which the motorcycle shows in the case of a forward collision, and normally means the movement that a rear wheel part of the motorcycle is jumped up by the kinetic energy of the motorcycle, and the motorcycle rotates forward around the center of gyration of the front wheel, or the collision area when the front part of the motorcycle, typically, the leading end part of a front wheel of the motorcycle collides with the collision object. "Region in front of the rider at pitching" or the "forward movement direction of the rider at pitching" broadly means the region or direction that a rider is thrown to move forward by the rotation when the motorcycle pitches. Further, "rider protection region of the motorcycle at pitching" means the region which is formed in front of the rider in the pitching of the motorcycle, and is typically formed above the rider protection region of the motorcycle in a forward collision.

Further, in the present invention the first expansion part can be structured to be expanded in the rider protection region of the motorcycle in the case of the forward collision of the motorcycle, and then, the second expansion part can be structured to be expanded in the rider protection region of the motorcycle at pitching, or on the contrary, the second expansion part can be structured to be expanded and then, the first expansion part is inflated. And finally, in the present invention the first expansion part and the second expansion part can be structured to be inflated at the same time.

In the "air bag apparatus" of the present invention, preferably the air bag and means for inflating the air bag, for example, an inflator, etc. is structured to be placed inside a retainer.

In one preferred form of the invention concerning the air bag related with the air bag apparatus of the motorcycle previously described the second expansion part is structured to be expanded to be crossed with the forward movement direction of the rider in the pitching of the motorcycle. Since the second expansion part is expanded to be crossed with the forward movement direction of the rider, it is possible to surely prevent the rider from being moving forward and protect the rider in the pitching of the motorcycle. The "cross" in the present invention broadly includes the shape that the expanded direction (extended direction) of the air bag are crossed with the forward movement direction of the rider at a certain angle within the possible ranges of the rider being restrained by the air bag without the rider being thrown forward at the pitching of the motorcycle as well as the shape that the inflated direction (extended direction) of the air bag and the forward movement direction of the rider are crossed over at a right angle.

In another preferred form of the invention concerning the air bag related with the air bag apparatus of the motorcycle previously described the second expansion part is expanded perpendicularly to the forward movement direction of the rider in the head or shoulder portion of the rider on the motorcycle when the motorcycle pitches forward. As described above, when the pitching of the motorcycle after forward collision, the rider is restrained at his or her head or shoulder portion by the air bag, which is inflated (extended) to be crossed with the forward movement direction at pitching of the motorcycle. Thus the rider is prevented from being thrown forward. The "head portion" is broadly defined by the face of a rider, the top of his head, the back of his head, or the like. In addition, the present invention includes the shape of being crossed in the head portion only, the shape of being crossed in the shoulder portion only, and the shape of being crossed in the head portion and the shoulder portion respectively.

In another preferred form of the invention concerning the air bag related with the air bag apparatus of the motorcycle previously described the second expansion part is expanded toward the rider protection region of the motorcycle at pitching, and it is also expanded to extend toward the side portion of the rider to better protect the side portion of the rider. In regards to the side protection of the rider in the present invention, the "side portion" is described as the entire or a part of the upper half of the body of the rider, or the entire body portion.

The invention described provides a motorcycle having each previously-described air bag apparatus installed therein.

In another aspect of the invention, a method of manufacturing an air bag apparatus for a motorcycle having the substantially the same components as those in the air bag apparatus previously-described is provided. Of course, a method of manufacturing an air bag apparatus for a motorcycle having the same components as those in each air bag apparatus previously-described can be provided.

BRIEF DESCRIPTION OF THE DRAWINGS

FIG. 16 also illustrates a configuration of the air bag formation according to the fifth example.

DETAILED DESCRIPTION OF THE PREFERRED EMBODIMENTS

Figure 1:
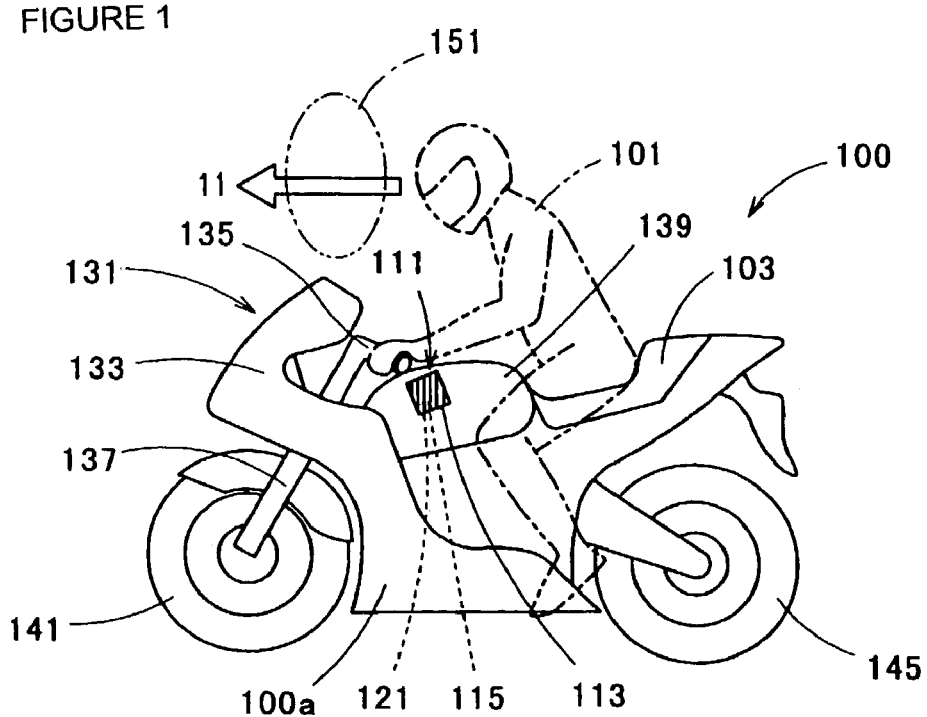
FIG. 1 illustrates an entire configuration of a motorcycle according to an embodiment of the present invention.

Now, the first embodiment of the present invention will be explained in detail in reference to the drawings. FIG. 1 illustrates a two-wheeled vehicle 100 and an air bag apparatus 111 provided on the two-wheeled vehicle 100 according to the first embodiment. The two-wheeled vehicle 100 is one example of the "motorcycle" of the present invention. The two-wheeled vehicle 100 includes a main body part 100a, a seat 103 on which a rider 101 sits astride, and a body constituent part 131 composed a front cowl 133, a handle 135, a head pipe 137 for supporting a handle, and a fuel tank 139. In addition, a front wheel 141 is provided on the lower side of the head pipe 137 for supporting a handle, and a rear wheel 145 is provided on the rear side of the main body part 100a.

An air bag apparatus 111 is deposed around the fuel tank 139 as one component of the body constituent part 131 over the main body part 100a of the two-wheeled vehicle 100.

Further, a rider protection region 151 is formed in front of the rider 101 above the body constituent part 131 of the two-wheeled vehicle 100 in the case of the forward collision of the two-wheeled vehicle 100. The "forward collision" in this embodiment is broadly defined as the type in which the two-wheeled vehicle 100 collides with a collision object in front of the two-wheeled vehicle 100. The "rider protection region 151" is the region, which is extended toward the forward movement direction 11 of the rider 101 to protect the rider 101 who is about to be thrown in front of the two-wheeled vehicle 100 when the rider 101 is about to move toward in front of the two-wheeled vehicle 100 by the kinetic energy in the forward collision.

Figure 2:
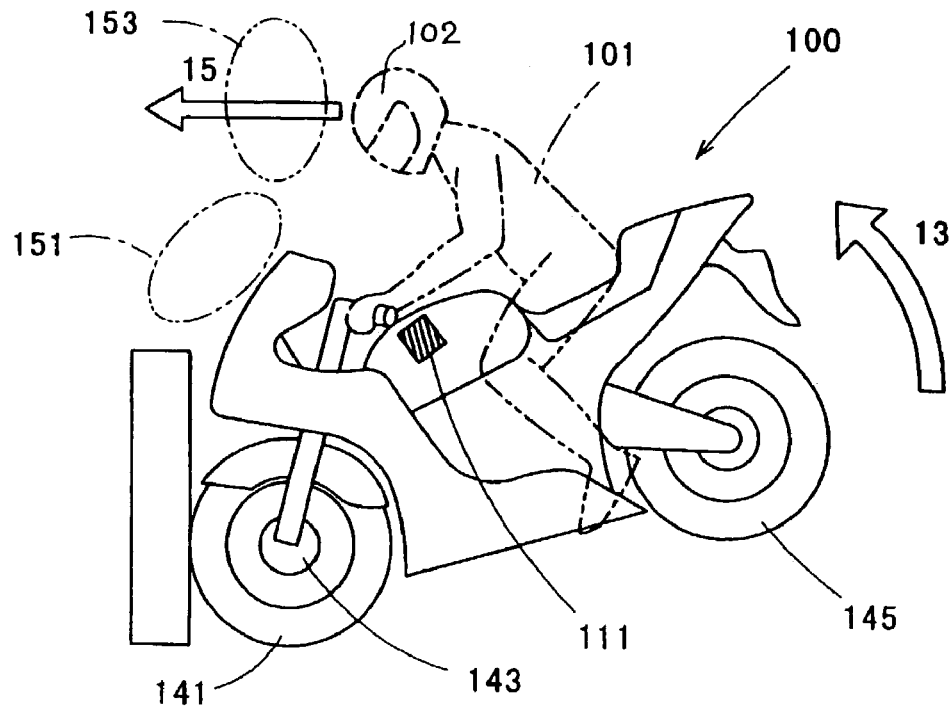
FIG. 2 illustrates a state that a motorcycle pitches.

Further, the two-wheeled vehicle 100 sometimes moves toward the direction of the arrow 13 as shown in FIG. 2 around the center of gyration 143 of the front wheel 141 in the case of the forward collision of the two-wheeled vehicle 100. Such movement as described above is defined as a "pitching" in this embodiment. In addition, the direction of the arrow 13 is defined as a "pitching direction" of the two-wheeled vehicle 100. In the meantime, the space region, which is extended toward the forward movement direction 15 of the rider 101 to protect the rider 101 who is about to move toward in front of the two-wheeled vehicle 100 by the kinetic energy in the forward collision when the two-wheeled vehicle 100 pitches, is defined as a "rider protection region 153 at pitching." As shown in FIG. 2, the rider protection region 153 at pitching is formed above the rider protection region 151.

Figure 3:
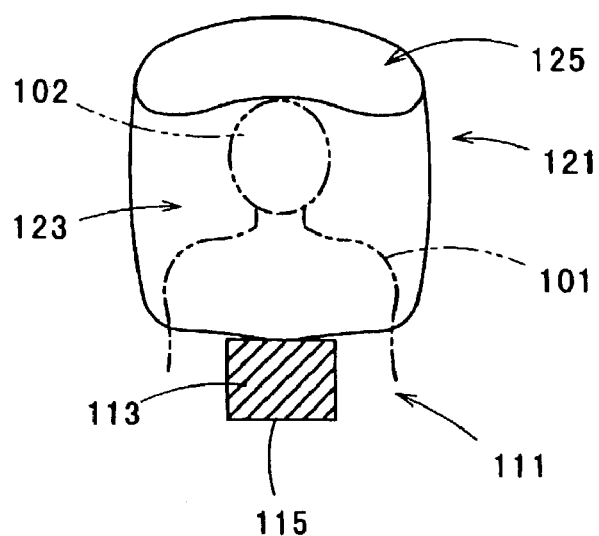
FIG. 3 illustrates a configuration of a air bag apparatus according to an embodiment of the present invention.

FIG. 3 illustrates the configuration of the air bag apparatus 111. The air bag apparatus 111 includes a retainer 113, and an inflator 115 and an air bag 121 placed inside the retainer 113. FIG. 3 shows the expanded and inflated state of the air bag 121. The air bag 121 includes an expansion part 123 for a rider protection region 151 having a necessary and sufficient size to protect the upper body of the rider 101, and an expansion part 125 for a rider protection region 153 at pitching, which is formed above the expansion part 123 of the rider protection region 151, and extended above the head portion 102 of the rider 101. The expansion part 123 for the rider protection region 151 corresponds to the "first expansion part" in the present invention, and the expansion part 125 for the rider protection region 153 at pitching corresponds to the "second expansion part" in the present invention.

In the relation to the two-wheeled vehicle 100 and the air bag 121, the expansion part 123 for the rider protection region is expanded toward the rider protection region 151 as shown in FIG. 1, and is used to restrain the rider 101 in the region 151. In the meantime, the expansion part 125 for the rider protection region at pitching is expanded toward the rider protection region 153 at pitching as shown in FIG. 2, and is used to restrain the rider 101 in the region 153 at pitching.

Figure 4:
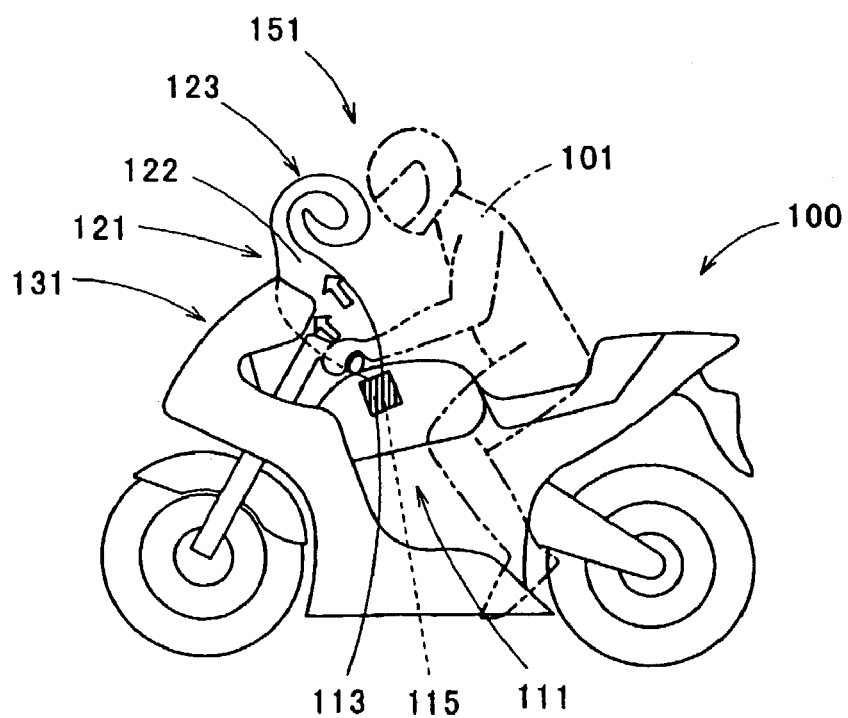
FIG. 4 illustrates a state at the start of the expansion of the air bag in the forward collision.

Now, the operation of the air bag apparatus 111 related to this embodiment will be explained in reference to FIGS. 4 to 8. In the case of a forward collision of the two-wheeled vehicle 100, the air bag apparatus 111 is operated such that the air bag 121 starts to be expanded from the retainer 113, and an inflation part 122 also starts to be inflated inside the air bag by supplying an inflation gas from the inflator 115 thereinto, which is shown in FIG. 4. As for the expansion sequence of the air bag 121, the expansion part 123 for the rider protection region is first expanded in the rider protection region 151. Since the expansion part for the rider protection region 123 is expanded upward above the body constituent part 131, the expansion part 123 for the rider protection region is never prevented from being expanded by the body constituent part 131.

Figure 5:
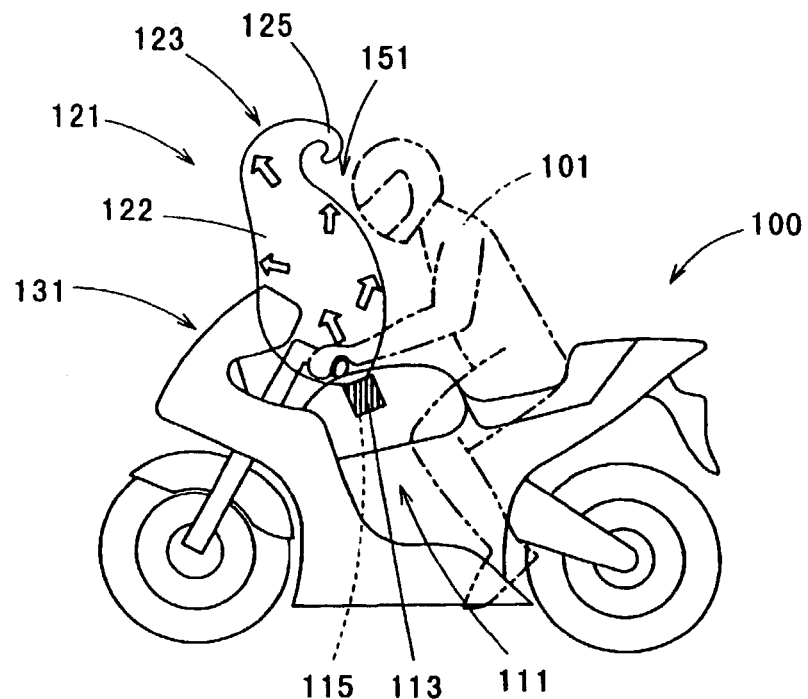
FIG. 5 illustrates a state of the air bag that is expanded and inflated in the rider protection region.

As a result, as shown in FIG. 5, the expansion part 123 for the rider protection region is expanded in the rider protection region 151, and the inflation part 122 is formed inside the expansion part 123 for the rider protection region by the inflation gas from the inflator 115.

Figure 6:
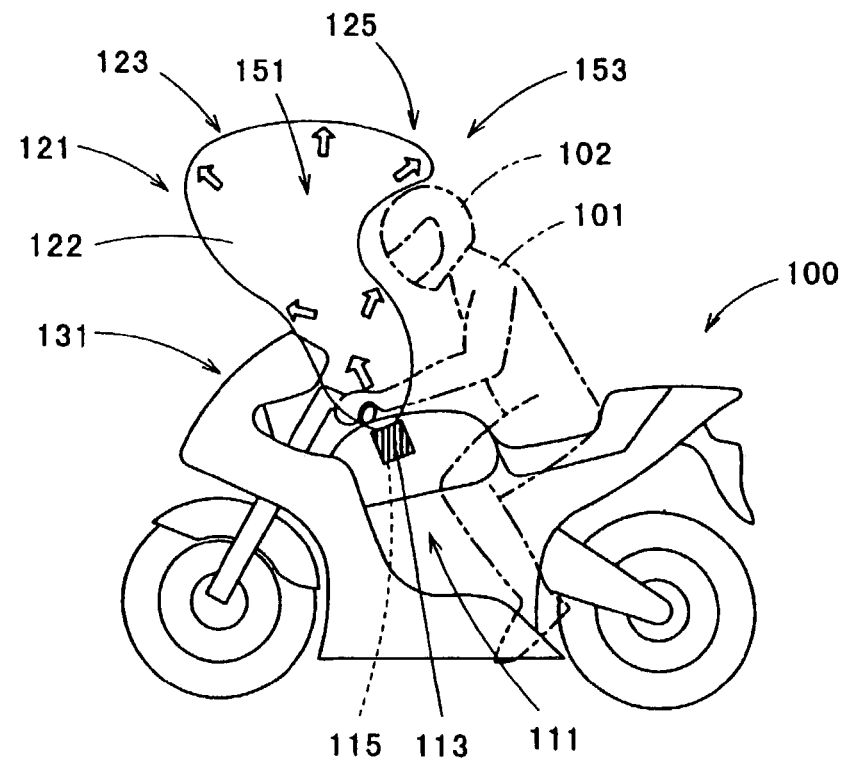
FIG. 6 illustrates a state of the air bag that is being expanded in a rider protection region at pitching.

Next, as shown in FIG. 6, the expansion part 125 for the rider protection region at pitching starts to be expanded in the rider protection region 153 at pitching.

Figure 7:
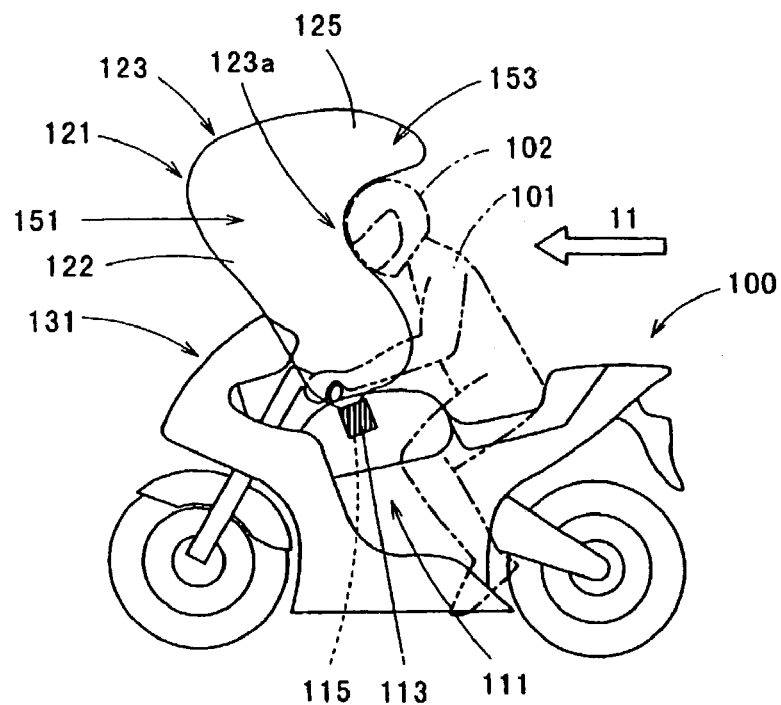
FIG. 7 illustrates a state that the air bag according to an embodiment of the present invention is expanded, and an inflation part is formed.

As described above, the expansion of the expansion part 123 for the rider protection region 151 and the expansion part 125 for the rider protection region 153 at pitching of the air bag 121 is completed, and the inflation part 122 is formed inside the air bag 121 as shown in FIG. 7. The expansion part 123 for the rider protection region of the air bag 121 forms the inflation part 122 in the rider protection region 151 in the case of the forward collision to fill that. Therefore, the rider 101, who is about to move toward the direction of the arrow 11 by the kinetic energy in the collision, is ensured to be restrained and held by a rider restraining part 123a, and thereby the rider 101 is prevented from being thrown toward in front of the two-wheeled vehicle 100.

Figure 8:
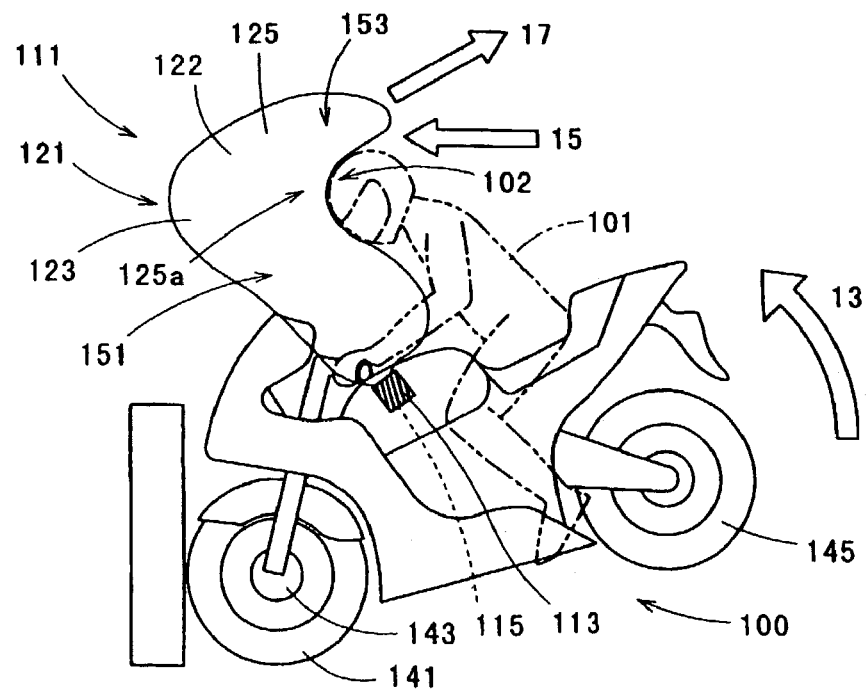
FIG. 8 illustrates a state of a rider protected in the rider protection region at pitching.

Further, the expansion part 125 for the rider protection region at pitching is formed and extends from the upper side of the expansion part 123 for the rider protection region to above the head of the rider 101. In other words, as shown in FIG. 8, the expansion part 125 for the rider protection region at pitching of the air bag 121 forms and fills completely the inflation part 122 in the rider protection region at pitching 153. Therefore, when the two-wheeled vehicle 100 moves in the pitching direction 13 around the center of the pitching 143 of a front wheel part 141 due to the forward collision, the expansion part 125 for the rider protection region at pitching ensures to restrain and hold the head portion 102 of the rider 101, who is about to move toward the direction of the arrow 15 by the kinetic energy in the collision, by a rider restraining part 125a, and prevents the rider 101 from being thrown toward in front of the two-wheeled vehicle 100.

As shown in FIG. 8, the expansion part 125 for the rider protection region at pitching is expanded to be crossed with the movement direction 15 of the rider 101 in the rider protection region 153 at pitching when the two-wheeled vehicle 100 pitches. The expansion direction (extension direction) of the expansion part 125 for the rider protection region 153 at pitching is shown as numeral 17 in FIG. 8. Therefore, it is possible to surely catch the rider 101, who is about to move forward to the movement direction 15 when the two-wheeled vehicle 100 pitches.

According to this embodiment, the expansion part 123 for the rider protection region 151 prevents the rider 101 from being thrown in front of the two-wheeled vehicle 100 due to the forward collision, and the expansion part 125 for the rider protection region 153 at pitching prevents the rider 101 from being thrown beyond the rider protection region 151 when the two-wheeled vehicle 100 pitches due to the forward collision, thus the restraining and protection of the rider in the case of a forward collision can be further assured.

Figure 9:
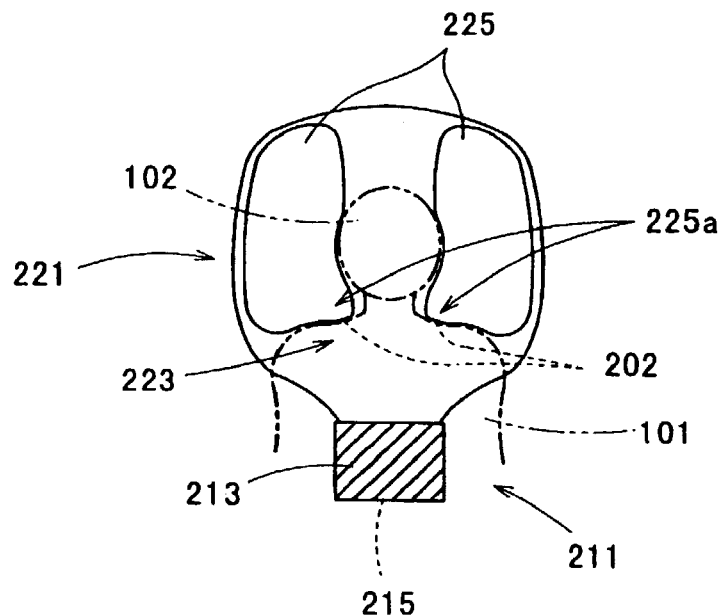
FIG. 9 illustrates a configuration of an air bag apparatus according to the second embodiment of the present invention.

Now, the second embodiment of the present invention will be explained in detail in reference to FIGS. 9 to 11. The second embodiment is related to the configuration modification of the air bag 121 in the first embodiment as above. Therefore, a detailed explanation for the components being essentially the same as those in the first embodiment will be omitted for convenience. As shown in FIG. 9, the air bag apparatus 211 in the second embodiment includes a retainer 213, and an air bag 221 and an inflator 215 placed inside the retainer 213. In addition, FIG. 9 illustrates the state that the air bag 221 is taken out of the retainer 213, and is expanded in front of a rider 101 for convenience.

The air bag 221 includes an expansion part 223 for the rider protection region 151, and an expansion part 225 for the rider protection region 153 at pitching. The expansion part 223 for the rider protection region 151 is expanded and inflated in front of the rider 101, and has a necessary and sufficient size to protect the upper body of the rider 101. In the meantime, the expansion part 225 for the rider protection region 153 at pitching is located on the right-and-left upper of the expansion part 223 for the rider protection region 151 respectively, and it is extended such that the rider restraining part 225a touches a shoulder portion 202 of the rider 101.

Figure 10:
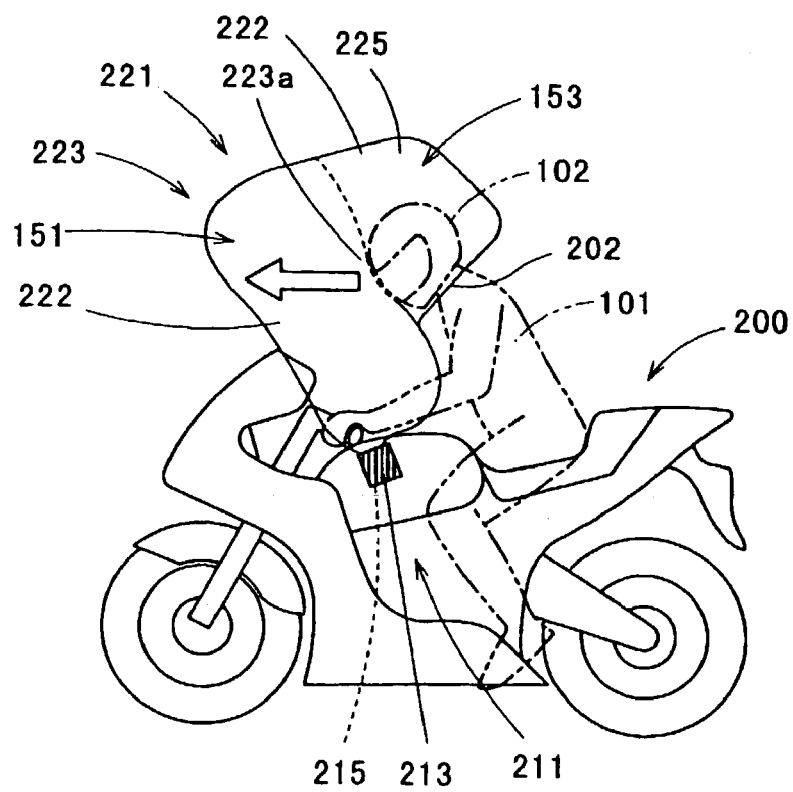
FIG. 10 illustrates a state that the air bag according to the second embodiment of the present invention is expanded, and an expansion part is formed.

From the view of the two-wheeled vehicle 200 as shown in FIG. 10, the expansion part 223 for the rider protection region 151 expands toward the rider protection region 151 to form an inflation part 222 in the case of the forward collision of the two-wheeled vehicle 200. Therefore, the rider 101 in the rider protection region 151 is restrained by a rider restraining part 223a. In the meantime, the expansion part 225 for the rider protection region at pitching is expanded from the expansion part 223 for the rider protection region 151 toward a rider protection region 153 at pitching to form the inflation part 222 as shown in FIG. 11. Then, when the two-wheeled vehicle 200 moves into the direction of the arrow 13 around the center of the pitching 143 of a front wheel part 141, the shoulder portion 202 of the rider 101 in the rider protection region 153 at pitching is restrained by the rider restraining part 225a so as to protect the rider 101. Further, as shown in FIG. 11, the expansion part 225 for the rider protection region at pitching is expanded such that the rider restraining part 225a is crossed with the direction of the arrow 15 of the movement of the rider 101, and therefore, it is possible to surely catch the rider 101 who is about to be thrown in front of the two-wheeled vehicle 200.

Figure 11:
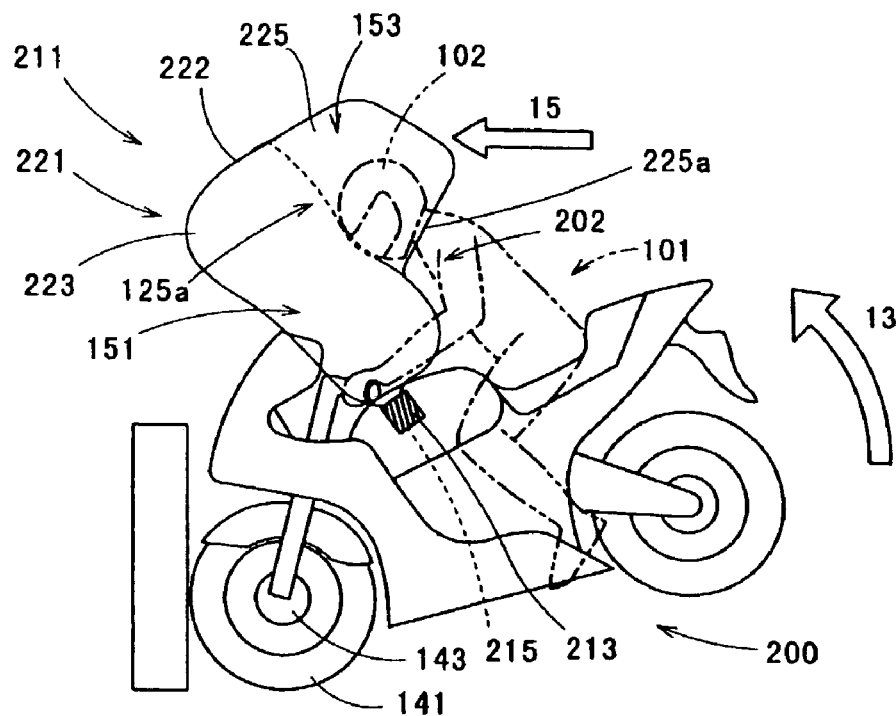
FIG. 11 illustrates a state of a rider protected in the rider protection region at pitching.

According to the second embodiment, the rider 101 is prevented from being thrown in front of the two-wheeled vehicle 200 due to the forward collision by the expansion part 223 for the rider protection region 151 as shown in FIG. 10, since the rider restraining part 225a in the expansion part 225 for the rider protection region 153 at pitching holds and restrains the shoulder portion 202 of the rider 101 when the two-wheeled vehicle 200 pitches due to the forward collision as shown in FIG. 11, and the rider 101 is prevented from being thrown beyond the rider protection region 153 at pitching and therefore, it is possible to surely protect the rider in the case of the forward collision.

Figure 12:
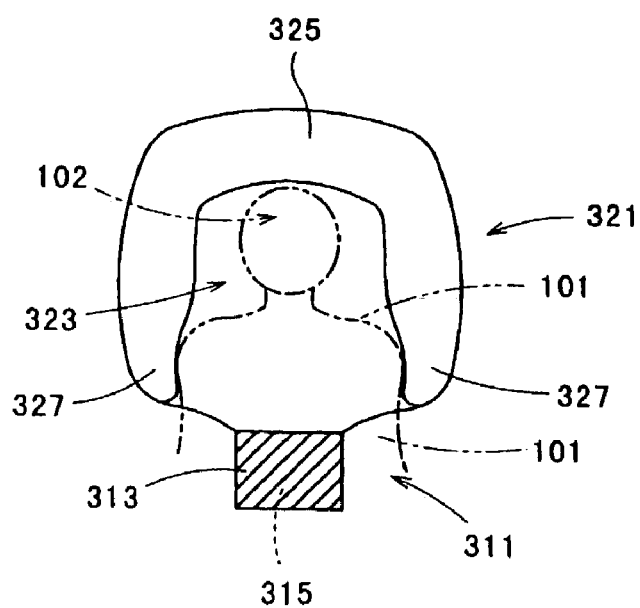
FIG. 12 illustrates a configuration of an air bag apparatus according to the third embodiment of the present invention.

Now, the third embodiment of the present invention will be explained in detail in reference to FIGS. 12 to 14. The third embodiment concerns the configuration modification of the air bag apparatus 111 in the first embodiment, with further consideration given to the side protection for the rider 101. As shown in FIG. 12, the air bag apparatus 311 in the third embodiment includes the retainer 313, and an air bag 321 and an inflator 315 placed inside the retainer 313. In addition, FIG. 12 illustrates for convenience the state that exists after the air bag 321 is taken out of the retainer 313, and is expanded in front of the rider 101.

The air bag 321 includes an expansion part 323 for a rider protection region 151 having a necessary and sufficient size to catch the upper body of the rider 101, and an expansion part 325 for a rider protection region 153 at pitching located above the expansion part 323 for the rider protection region 151 and extended up to the upper side of the head portion 102 of the rider 101. The expansion part 325 for the rider protection region at pitching is also connected to a pair of side expansion parts 327 respectively, which extends and expands to the right-and-left of the rider 101.

Figure 13:
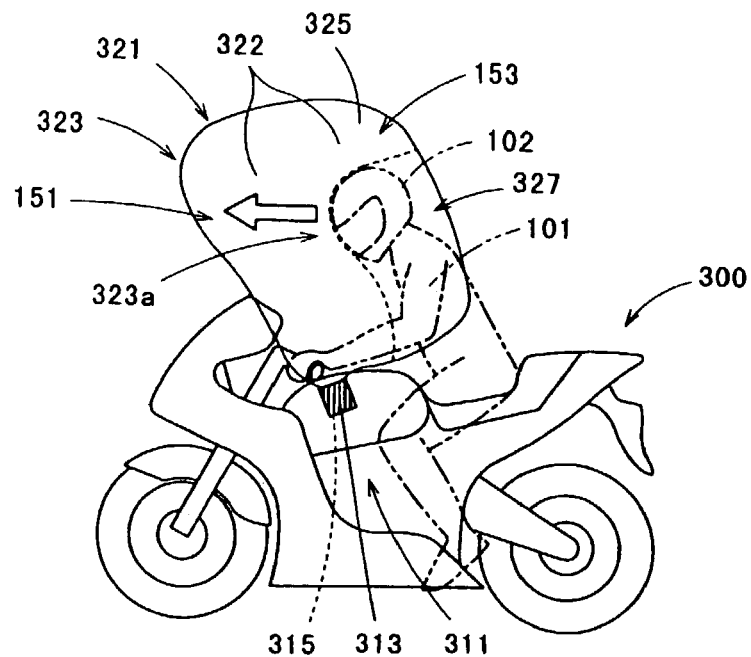
FIG. 13 illustrates a state that the air bag according to the third embodiment of the present invention is expanded, and an expansion part is formed.

From the view of the two-wheeled vehicle 300, as shown in FIG. 13, the expansion part 323 for the rider protection region 151 expands toward the rider protection region 151 in the case of a forward collision involving the two-wheeled vehicle 300 to form an inflation part 322. Therefore, the rider 101 in the rider protection region 151 is restrained by a rider restraining part 323a. In the meantime, the expansion part 325 for the rider protection region at pitching is expanded from the expansion part 323 for the rider protection region 151 toward a rider protection region 153 at pitching to form the inflation part 322. Therefore, as shown in FIG. 14, when the two-wheeled vehicle 300 moves in the direction of the arrow 13 around the center 143 of the pitching of a front wheel part 141, the head portion 102 of the rider 101 is restrained by the rider restraining part 325a so as to protect the rider 101. Further, as shown in FIG. 14, since the expansion part 325 for the rider protection region at pitching expands (extends) such that the rider restraining part 325a is crossed with the direction of the arrow 15 of the movement of the rider 101, it is possible to surely catch the rider 101 who is about to be thrown in front of the two-wheeled vehicle 300.

Figure 14:
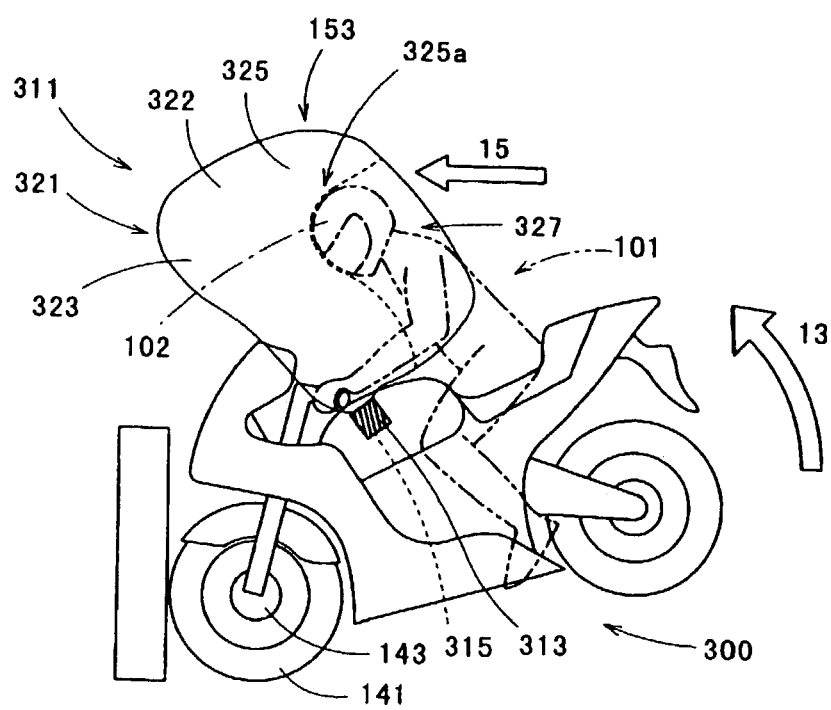
FIG. 14 illustrates a state of a rider protected in the rider protection region at pitching.

Further, in the third embodiment as shown in FIGS. 13 and 14, the side expansion part 327 expands and inflates to cover the side portion of the body of the rider 101. Therefore, the right-and-left sides of the rider 101 are also protected by the side expansion part 327 in the case of vehicle accidents, resulting in better protection for the rider 101.

Figure 15:
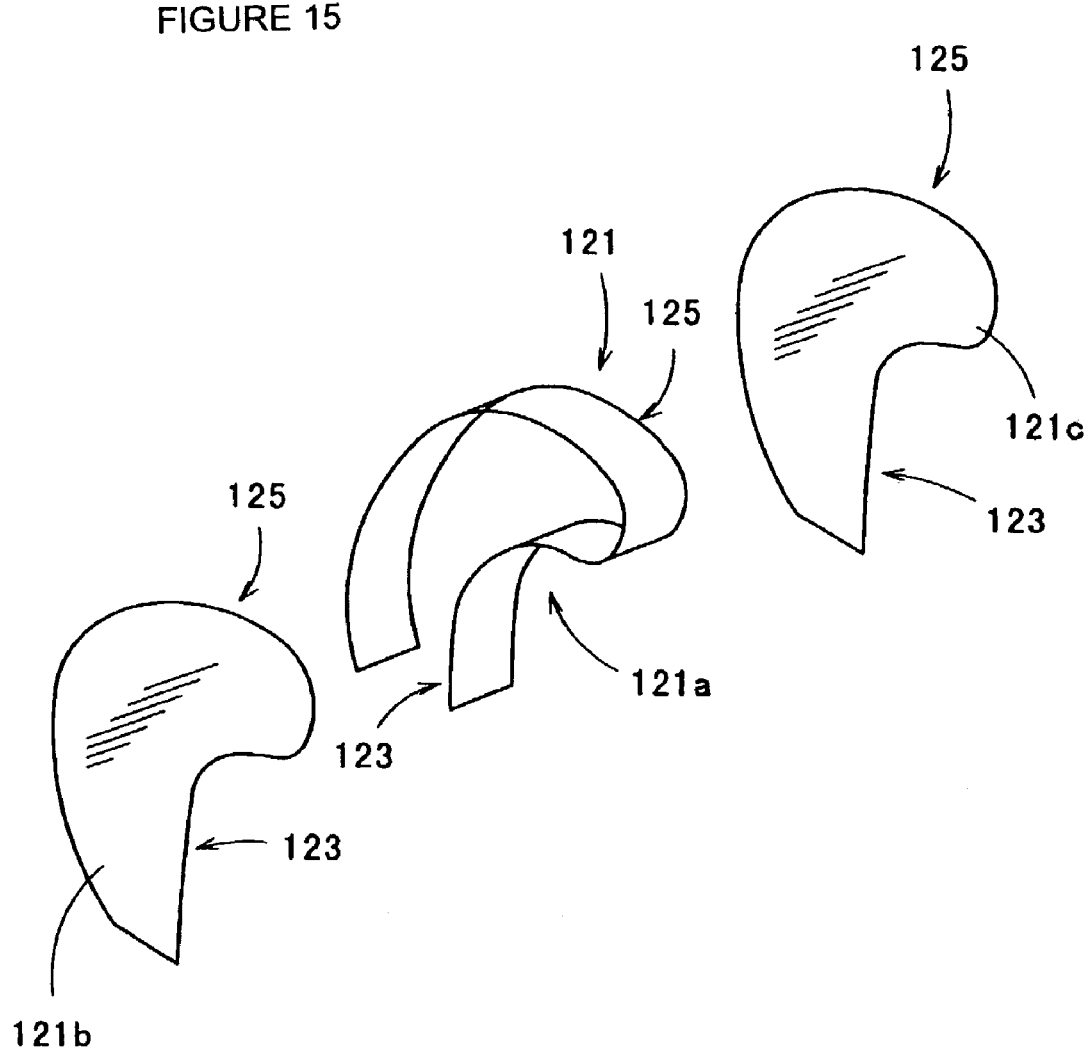
FIG. 15 illustrates a configuration of the air bag formation according to the first example.

Now, a method of forming the air bag 121 according to the embodiments of the present invention will be explained in reference to FIGS. 15 to 31. The first example of forming the air bag 121 is illustrated in FIG. 15. In this example, the air bag 121 is formed by sewing side clothes 121b, 121c composing the right-and-left both sides of the air bag 121, on a intermediate cloth 121a composing the body of the air bag 121, to adhere them. Each cloth 121a, 121b, 121c has a shape corresponding to the expansion part 123 for the rider protection region 151 and the expansion part 125 for the rider protection region 153 at pitching, respectively.

Figure 16:
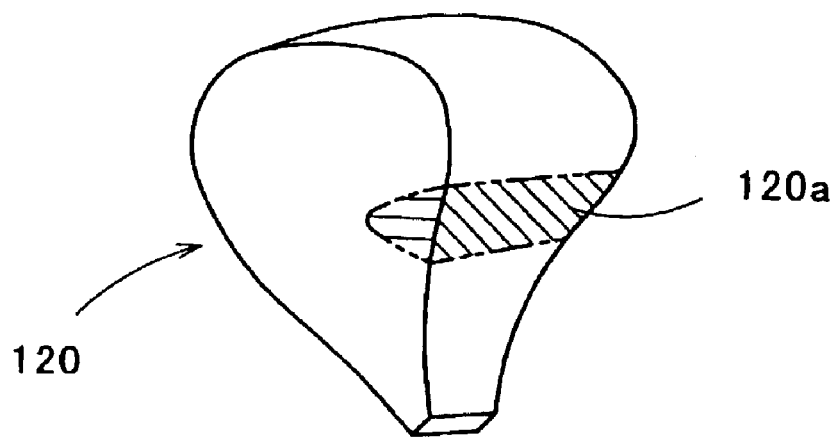
FIG. 16 illustrates a configuration of the air bag formation according to the second example.
Figure 17:
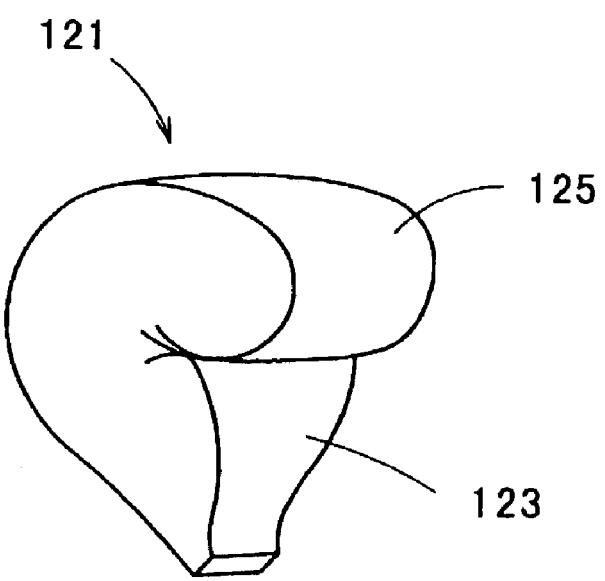
FIG. 17 illustrates a configuration of the air bag formed by the second example.
Figure 18:
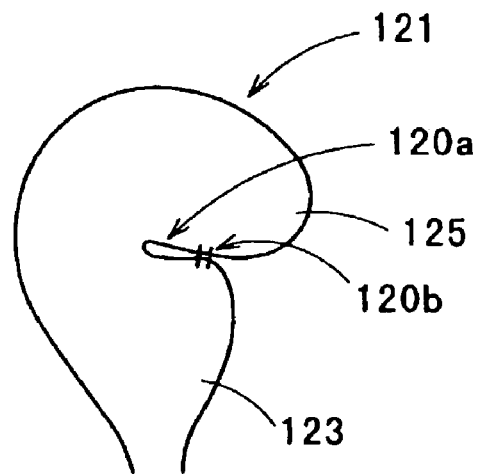
FIG. 18 illustrates the longitudinal section view of the air bag formed by the second example.

The second example of forming the air bag 121 is illustrated in reference to FIGS. 16 to 18. In this example, the air bag 121 is formed by the tucked sewing a sack-shaped molded member 120 in appropriate. First, a sack-shaped molded member 120 is prepared as shown in FIG. 16. Then, the middle part 120a of the sack-shaped molded member 120 is performed the tucked sewing. Specifically, the sack-shaped molded member 120 is turned inside out, and its inner surface outside is performed the tucked sewing, and then, the sack-shaped molded member 120 is turned outside in again so that the air bag 121 is obtained as shown in FIG. 17, with the expansion part 123 for the rider protection region 151 and the expansion part 125 for the rider protection region 153 at pitching. FIG. 18 illustrates the longitudinal sectional view of the sack-shaped molded member 120, a stitching part 120b by the tucked sewing is sewed in the middle part 120a, and the expansion part 123 for the rider protection region 151 and the expansion part 125 for the rider protection region 153 at pitching are formed thereby.

Figure 19:
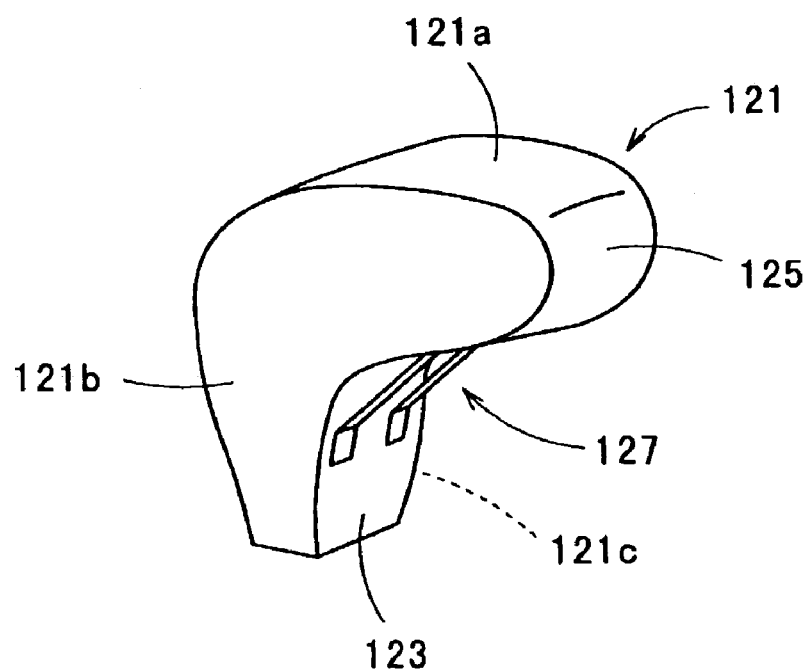
FIG. 19 illustrates a configuration of the air bag formation according to the third example.

The third example of forming the air bag 121 is illustrated in reference to FIG. 19. In this example, the air bag 121 having the expansion part 123 for the rider protection region 151 and the expansion part 125 for the rider protection region 153 at pitching of the air bag 121 is formed by suturing a tether strap 127 on the outside of the air bag 121. That is, the air bag 121 is formed by sewing and fixing each of the right and the left side cloth 121b, 121c on a intermediate cloth 121a by the outer tether strap 127.

Figure 20:
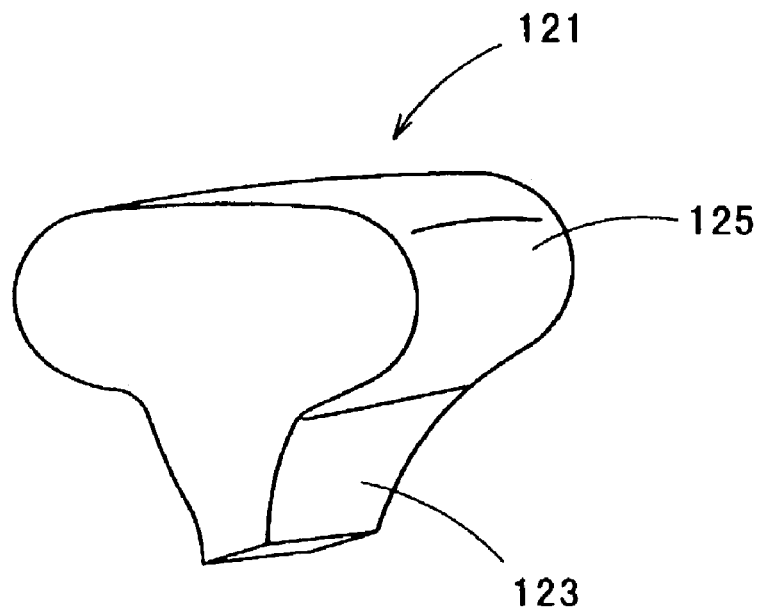
FIG. 20 illustrates a configuration of the air bag formation according to the forth example.

Further, the fourth example of forming the air bag 121 is illustrated in FIG. 20. In this example, the upper side of the air bag 121 is extended toward the front and the rear direction of the two-wheeled vehicle, and the air bag 121 is formed a T-shape. The expansion part 125 for the rider protection region 153 at pitching is formed on the upper elongated part of the T-shape, and the expansion part 123 for the rider protection region 151 is formed under that.

Figure 21:
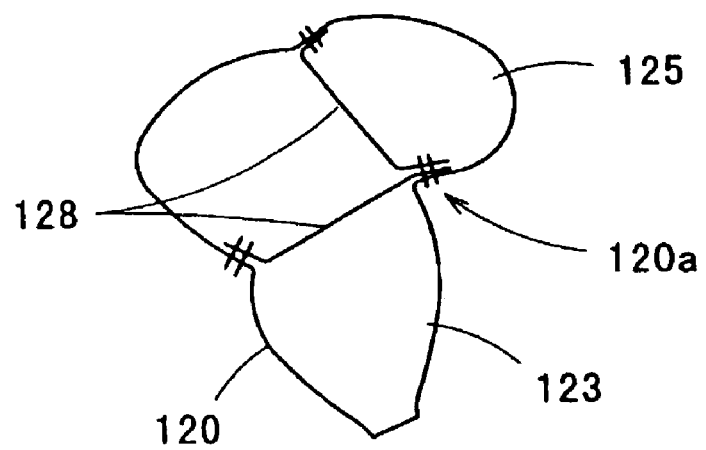
FIG. 21 illustrates a configuration of the air bag formation according to the fifth example.
Figure 22:
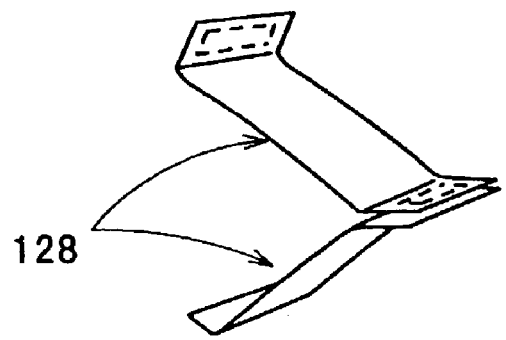
Figure 23:
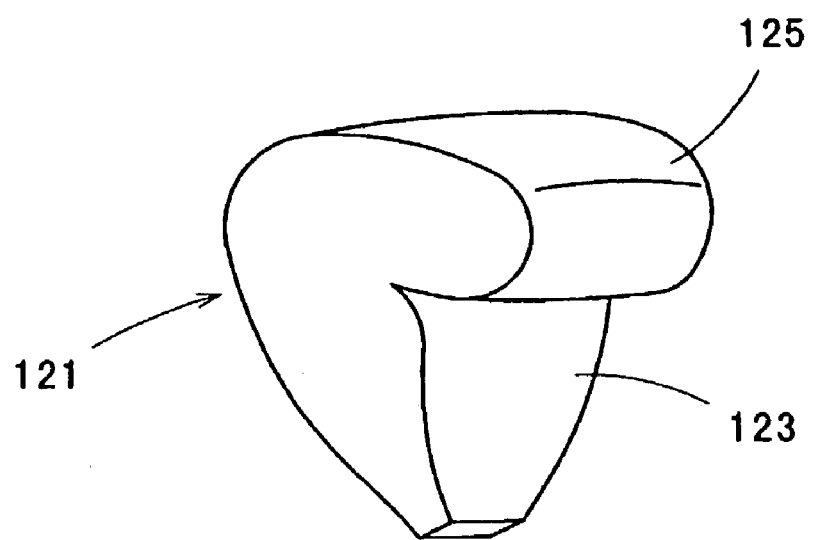
FIG. 23 illustrates a configuration of the air bag formed by the fifth example.

The fifth example of forming the air bag 121 is illustrated in reference to FIGS. 21 to 23. In this example, a pair of tether straps 128 is provided inside the sack-shaped molded member 120 as shown in FIG. 21. As shown in FIG. 22, a pair of the tether straps 128 are sewed in advance, and integrally formed. Then, a middle part 120a of the sack-shaped molded member 120 as shown in FIG. 21 is inwardly drawn and sewed by using the tether straps 128 so as to form the air bag 121 having the expansion part 123 for the rider protection region 151 and the expansion part 125 for the rider protection region 153 at pitching as shown in FIG. 23.

Figure 24:
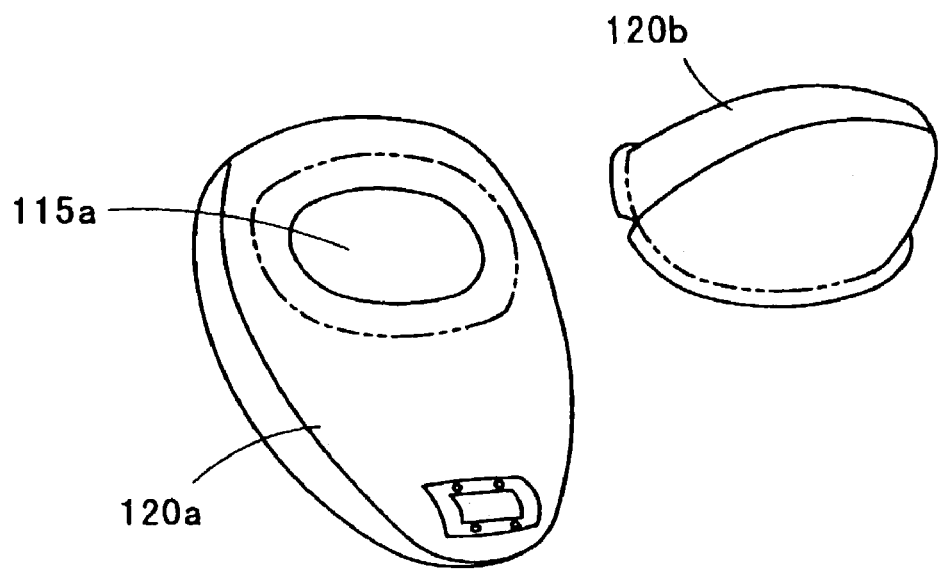
FIG. 24 illustrates the configuration of the air bag formation according to the sixth example.
Figure 25:
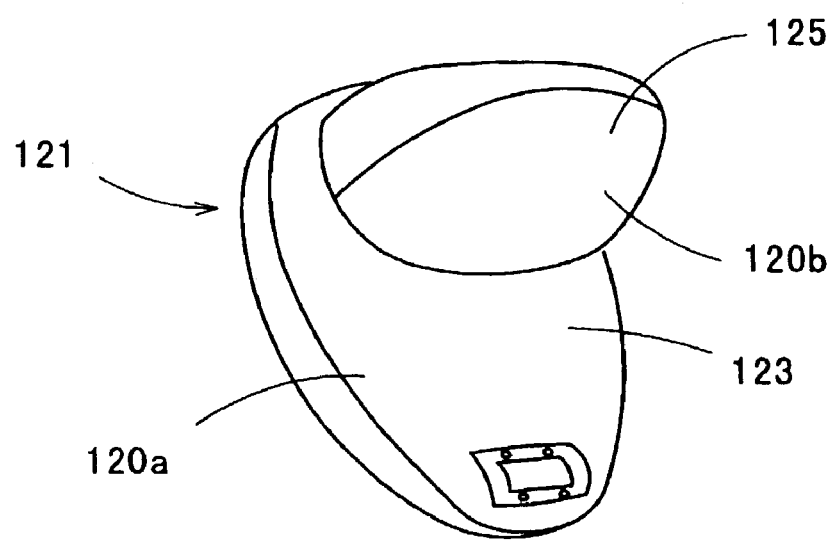
FIG. 25 illustrates the configuration of the air bag formed by the sixth example.

The sixth example of forming the air bag 121 is illustrated in FIGS. 24 and 25. As shown in FIG. 24, the first sack-shaped molded member 120a is formed by sewing a plurality of cloth with each other, and the second sack-shaped molded member 120b, which is formed to have a hemispherical shape by sewing a plurality of cloth just as the same way as the above, is sewed on the first sack-shaped molded member 120a. A hole part 115a is provided on the first sack-shaped molded member 120a to pass an inflation gas supplied from the inflator 115 (reference to FIG. 3) therethrough, and the second sack-shaped molded member 120b is sewed around the hole part 115a. As described above, the air bag 121 having the expansion part 123 for the rider protection region 151 and the expansion part 125 for the rider protection region 153 at pitching as shown in FIG. 25 is formed. The first sack-shaped molded member 120a forms the expansion part 123 for the rider protection region 151, and the second sack-shaped molded member 120b forms the expansion part 125 for the rider protection region 153 at pitching.

Figure 26:
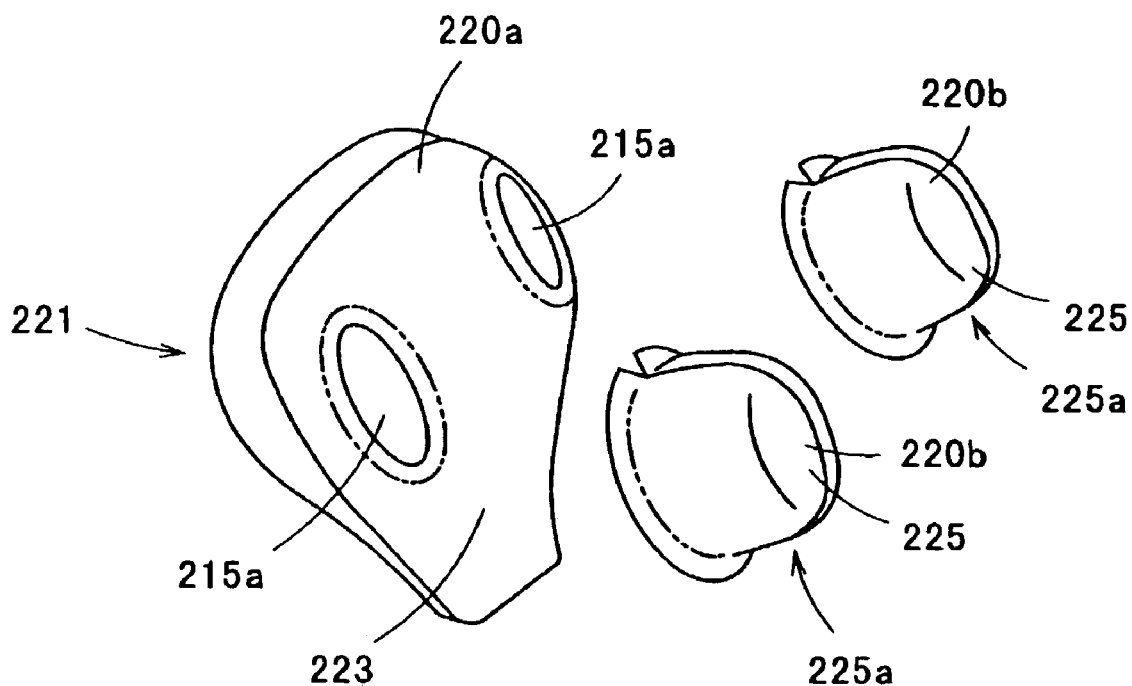
FIG. 26 illustrates the configuration of an example of the air bag formation according to the second embodiment of the present invention.

Further, an example of the mold configuration of the air bag 221 used in the second embodiment is illustrated in FIG. 26. In this example, a sack-shaped molded member 220a forming the expansion part 223 for the rider protection region 151, is formed by sewing a plurality of cloth with each other. Further, a pair of the right-and-left sack-shaped molded members 220b, and each of which has a hemispherical shape and forms the expansion part 225 for the rider protection region 153 at pitching, by sewing a plurality of cloth just as the same way as described above, is sewed and adhered on the sack-shaped molded member 220a. The rider restraining part 225a (reference to FIG. 11) which restrains the shoulder portion 202 of the rider at pitching is formed on the lower of the sack-shaped molded member 220b. Further, a hole part 215a is provided on the right and left of the first sack-shaped molded member 220a respectively to pass an expansion gas supplied from the inflator 115 (reference to FIG. 3), and the sack-shaped molded member 220b is sewed around each hole part 215a.

Figure 27:
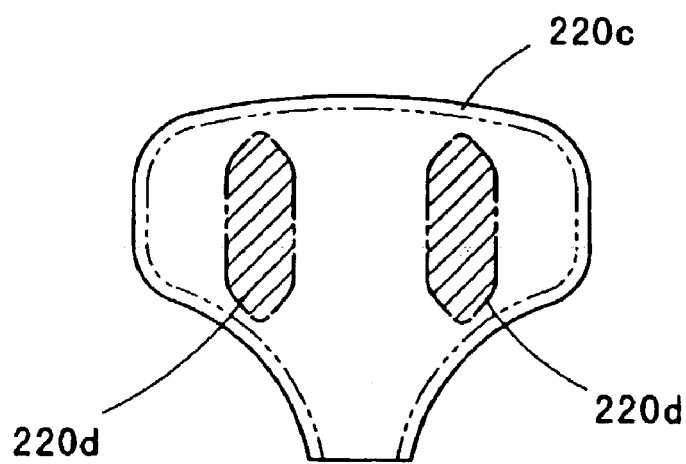
FIG. 27 illustrates the configuration of the second example of the air bag formation according to the second embodiment of the present invention.
Figure 28:
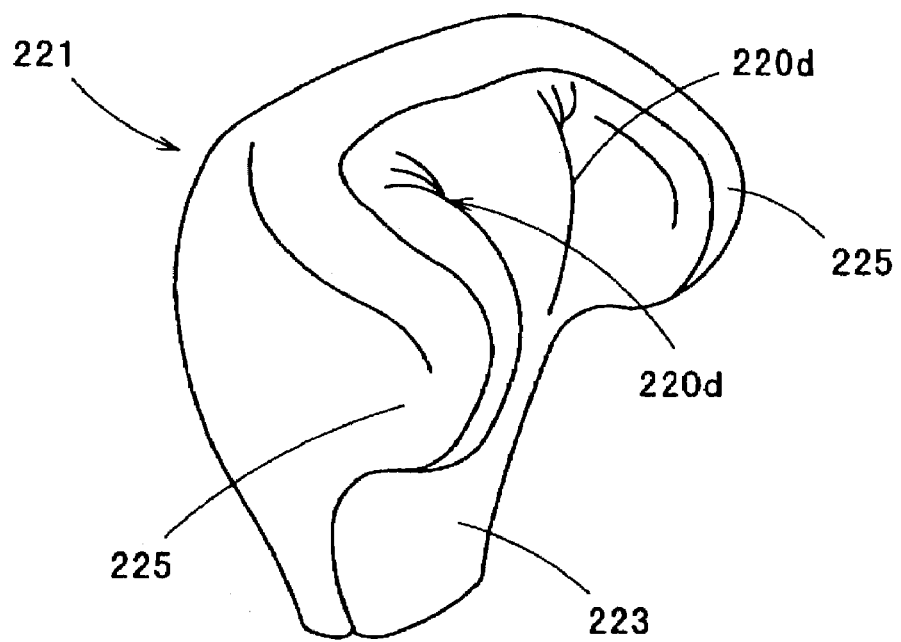
FIG. 28 illustrates the configuration of the air bag formed by the second example according to the second embodiment of the present invention.

Another example of the mold configuration of the air bag 221 used in the second embodiment about forming an airbag is illustrated in FIGS. 27 and 28. In this example, a sack-shaped molded member 220c, which is formed by sewing the outer edge of two pieces of clothes composing an outer and an inner surface, to be substantially T-shaped as shown in FIG. 27, is prepared in advance, and each source part 220d of the T-shape performs the tucked sewing. By the tucked sewing, the right-and-left elongated parts of the T-shape are raised up, and like above, the air bag 221 having the expansion part 223 for the rider protection region and the expansion part 225 for the rider protection region at pitching as shown in FIG. 28 is formed.

Figure 29:
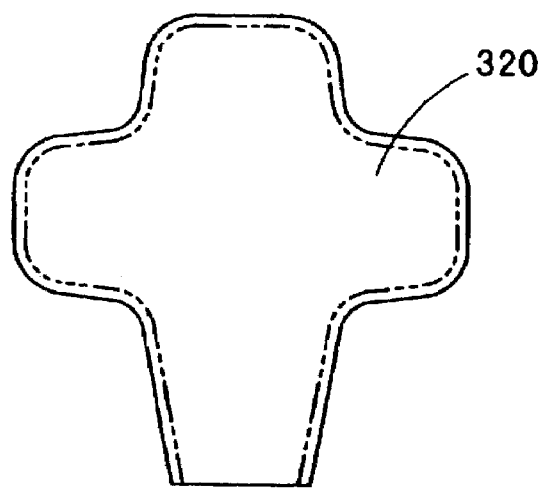
FIG. 29 illustrates the configuration of the air bag formation according to the third embodiment of the present invention.
Figure 30:
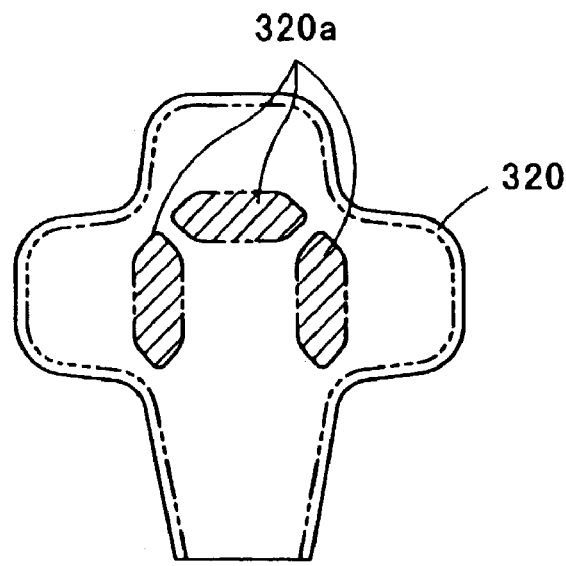
FIG. 30 also illustrates the configuration of the air bag formation according to the third embodiment of the present invention.
Figure 31:
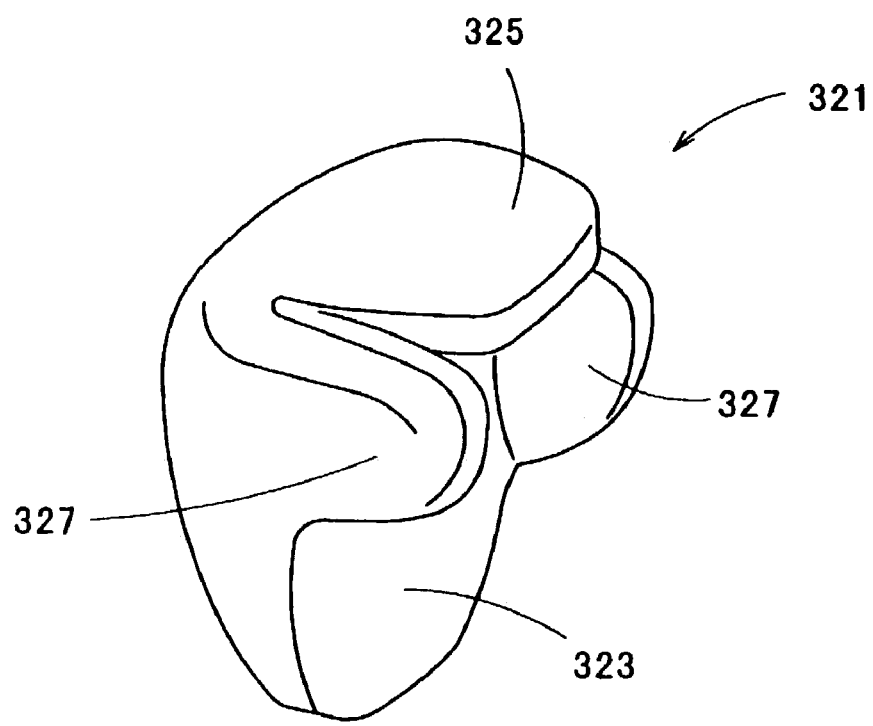
FIG. 31 illustrates the configuration of the air bag formed according to the third embodiment of the present invention.

Further, an example of the mold configuration of the air bag 321 used in the third embodiment about forming an airbag is illustrated in FIGS. 29 to 31. A sack-shaped molded member 320, which is formed by sewing two pieces of cloth composing an outer and an inner surfaces, to be cruciform as shown in FIG. 29. Then, three parts (referred to as numeral 320a) around the center part of the sack-shaped molded member 320 perform the tucked sewing as shown in FIG. 30. As described above, each protrusion of the sack-shaped molded member 320 is raised up, and as shown in FIG. 31, the air bag 321 having the expansion part 323 for the rider protection region 151, the expansion part 325 for the rider protection region 153 at pitching, and the side expansion part 327 is formed.

Now, the embodiment examples for manufacturing the air bag as above will be provided as follows. That is,

EXAMPLE 1

"In the method of manufacturing an air bag apparatus for a motorcycle the method of manufacturing an air bag apparatus for a motorcycle further including a step of forming the first and the second expansion parts by suturing and adhering a plurality of cloth members."

EXAMPLE 2

"In the method of manufacturing an air bag apparatus for a motorcycle described in the example 1, the method of manufacturing an air bag apparatus for a motorcycle characterized in that the plurality of cloth members are sutured with each other by a tether strap."

EXAMPLE 3

"In the method of manufacturing an air bag apparatus for a motorcycle the method of manufacturing an air bag apparatus for a motorcycle further including a step of forming the first and the second expansion parts by the tucked sewing a portion of a sack-shaped molded member."

EXAMPLE 4

"In the method of manufacturing an air bag apparatus for a motorcycle the method of manufacturing an air bag apparatus for a motorcycle further including a step of forming the first sack-shaped molded member corresponding to the first expansion part, forming the second sack-shaped molded member corresponding to the second expansion part, and forming an air bag by sewing the first and the second sack-shaped molded members."

According to the all above examples, the technology for efficiently forming the air bag of the present invention is provided.

According to the present invention, the technology useful for building an air bag apparatus corresponding to the movement shapes found in the motorcycle involved in motorcycle accidents is provided.

What is claimed is:

1. An air bag apparatus for a motorcycle having a frame for supporting a seat for a motorcycle rider rearward of a steering handle of the motorcycle, the air bag apparatus comprising:
    an air bag for being deployed generally forwardly of the motorcycle rider, the airbag having an undeployed state and a deployed state;
    a retainer that is fixed at a predetermined location on the motorcycle and holds the airbag in the undeployed state;
    a first portion of the air bag inflated in a first upward direction from the retainer at the fixed location thereof into operative position for engaging the rider so that the rider is restrained against being propelled forwardly from the seat upon occurrence of a forward impact with the motorcycle; and
    a second, upper portion of the air bag inflated in a second direction transverse to the first direction into operative position for engaging the rider so that the rider is restrained against being propelled upwardly and forwardly from the seat upon occurrence of a forward pitching or pivoting action of the motorcycle due to the forward impact therewith, so that in the deployed state of the airbag with the first and second airbag portions inflated into the operative positions thereof, the deployed airbag is still held only by the retainer at the fixed location thereof with the rider engaged with the inflated airbag.

2. The air bag apparatus of claim 1, wherein the first air bag portion extends generally upwardly during inflation, and the second air bag portion extends generally rearwardly from the first air bag portion during inflation.

3. The air bag apparatus of claim 1, wherein the second portion of the air bag extends in a direction generally normal to the upward and forward rider motion relative to the seat generated by the motorcycle forward pitching action.

4. The air bag apparatus of claim 1, wherein the second portion of the air bag includes lateral portions that are disposed along either side of the motorcycle rider when inflated into operative position.

5. The air bag apparatus of claim 4, wherein the first air bag portion has a lower end, and
    lower ends of the lateral portions raised relative to the lower end of the first air bag portion for restraining the rider up along their shoulders.

6. The air bag apparatus of claim 1 including a single inflator for inflating both the first and second portions of the air bag.

7. The air bag apparatus of claim 6, wherein the inflator generally inflates the first air bag portion prior to the second air bag portion.

8. The air bag apparatus of claim 1 wherein the predetermined location of the retainer is between the seat and steering handle, and the air bag is sized so that the operative position of the inflated second, upper portion is closely adjacent the rider still on the seat.

9. The air bag apparatus of claim 8 wherein the inflated second, upper air bag portion extends generally rearwardly from the inflated first air bag portion, and the second, upper air bag portion is at a predetermined position up along the inflated first air bag portion so that the second, upper portion extends rearwardly closely adjacent and over the head of the seated rider when inflated.

10. The air bag apparatus of claim 8 wherein the inflated second, upper air bag portion includes a pair of laterally spaced portions extending generally rearwardly from either side of the inflated first air bag portion, and the laterally spaced portions are at predetermined portions up along the inflated first air bag portion so that the laterally spaced portions extend rearwardly closely adjacent and over the shoulders of the seated rider when inflated.

11. The air bag apparatus of claim 8 wherein the inflated second, upper air bag portion includes a pair of laterally spaced portions extending generally rearwardly from either side of the inflated first air bag portion and an interconnecting upper portion extending generally rearwardly from the inflated first air bag portion and between the laterally spaced portions, and the laterally spaced portions being at predetermined portions on either side of the inflated first air bag portion so that the laterally spaced portions extend rearwardly closely adjacent and along either side of the seated rider when inflated and the interconnecting upper portion being at a predetermined position up along the inflated first air bag portion so that the interconnecting upper portion extends rearwardly closely adjacent and over the head of the seated rider when inflated.

12. An air bag apparatus for a motorcycle having a frame for supporting a seat for a motorcycle rider rearward of a steering handle of the motorcycle, the air bag apparatus comprising:
    an air bag for being deployed generally forwardly of the motorcycle rider, the airbag having an undeployed state and a deployed state;
    a retainer that is fixed at a predetermined location on the motorcycle and holds the airbag in the undeployed state;
    a first portion of the air bag inflated in a first upward direction from the retainer at the fixed location thereof into operative position for engaging the rider so that the rider is restrained against being propelled forwardly from the seat upon occurrence of a forward impact with the motorcycle; and
    a second, upper portion of the air bag inflated in a second direction transverse to the first direction into operative position for engaging the rider so that the rider is restrained against being propelled upwardly and forwardly from the seat upon occurrence of a forward pitching or pivoting action of the motorcycle due to the forward impact therewith, so that in the deployed state of the airbag with the first and second airbag portions inflated into the operative positions thereof, the deployed airbag is still held by the retainer at the fixed location thereof with the rider engaged with the inflated airbag;
    wherein the second portion of the air bag includes lateral portions that are disposed along either side of the motorcycle rider when inflated into operative position, the lateral portions extend rearwardly from the first air bag portion, and an upper portion of the second air bag portion extends between the lateral portions.

13. The air bag apparatus of claim 12, wherein the first air bag portion includes upper and lower ends, and the lateral portions include upper and lower ends generally coextensive with the first air bag portion upper and lower ends.

14. The air bag apparatus of claim 12, wherein the first air bag portion has a lower end, and
    lower ends of the lateral portions raised relative to the lower end of the first air bag portion.

* * * * *